United States Patent [19]
Garlanov et al.

[11] Patent Number: 4,691,090
[45] Date of Patent: Sep. 1, 1987

[54] METHOD AND DEVICE FOR PLASMA CUTTING OF NON-METALLIC MATERIALS

[75] Inventors: Dimo T. Garlanov; Dimieter A. Dimitrov; Marin H. Beleov; Vladimir P. Hlbearov; Ivan V. Vangelov, all of Sofia; Nikolay Y. Nikov, Varna; Ivan S. Savov, Sofia, all of Bulgaria

[73] Assignee: NPK za Kontrolno Zavarachni Raboti, Sofia, Bulgaria

[21] Appl. No.: 214,796

[22] Filed: Dec. 9, 1980

[51] Int. Cl.⁴ .................................. B23K 9/00
[52] U.S. Cl. ................... 219/121 PC; 219/121 PH; 219/121 PR; 83/16; 264/22
[58] Field of Search ...... 219/121 P, 121 PY, 121 PD, 219/121 PC, 121 PH, 121 PF, 121 PP, 121 PM, 74, 384, 75; 83/15, 16, 170; 313/231.3–231.6; 264/22, 27

[56] References Cited

U.S. PATENT DOCUMENTS

| | | | |
|---|---|---|---|
| 3,816,087 | 6/1974 | Van Duuren et al. | 219/121 P |
| 3,940,641 | 2/1976 | Dooley | 219/121 PR |
| 3,944,778 | 3/1976 | Bykhovsky et al. | 219/121 PR |
| 4,118,618 | 10/1978 | Gauthier et al. | 219/121 PP |

FOREIGN PATENT DOCUMENTS 0736582  6/1966  Canada ........................ 219/121 P

*Primary Examiner*—M. H. Paschall

[57] ABSTRACT

An improved method and arrangement for cutting non-metallic materials by means of a plasma arc which is formed between a plasma torch and a confronting non-melting electrode-anode. The arrangement includes an arrangement for rotating the electrode-anode during and/or prior to cutting and an arrangement for forcibly elongating the plasma arc prior to cutting by increasing the distance between the plasma torch and electrode-anode prior to cutting. The arrangement includes a support for jointly supporting the plasma torch and electrode-anode. This support is adapted to be partly or completely moved relative to the non-metallic material to be cut. Conduits for a cooling medium are incorporated in the support and the non-melting electrode-anode.

4 Claims, 4 Drawing Figures

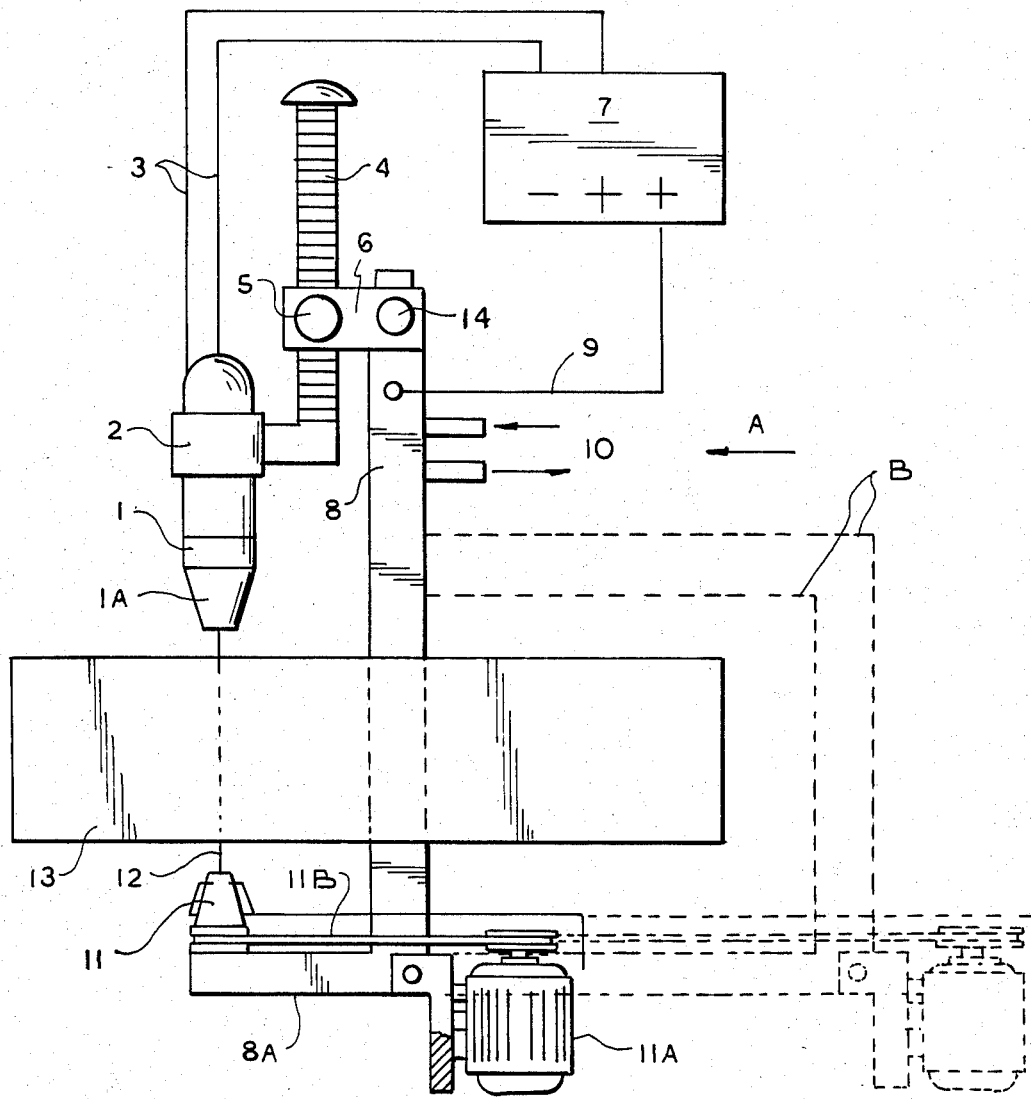
F I G. 1

METHOD AND DEVICE FOR PLASMA CUTTING OF NON-METALLIC MATERIALS

BACKGROUND OF THE INVENTION

This invention refers to a method and a device for plasma cutting of non-metallic materials, which can be applied in industrial construction when cutting items such as concrete slabs or panels.

A method is known for the cutting of non-metallic materials, whereby the processed material is subjected to the mechanical action of a diamond disc which rotates and moves to cut. The main disadvantage of this known method is that, the diamond disc is very expensive and wears out relatively easily.

A method for plasma cutting and processing of non-metallic materials is also known, whereby the plasma arc, generated by a plasmatron, burns between an electrode-cathode and a nozzle-anode, and is blown by the plasma-forming gas, which is fed under pressure to the chamber of the plasmatron. As a result, in the nozzle channel a narrow plasma arc and a plasma torch are formed, the latter flowing out of the nozzle. The material, which is processed, is subjected to the action of the plasma torch, and as a result the cut is formed.

Several disadvantages of the latter method are that the cutting is done by an indirect arc, which significantly reduces the efficiency of the process, the zone affected by the heat is wide, and cracks can be formed in the material.

A common disadvantage of the known methods for cutting non-metallic materials is the low cutting speed, which makes for a reduced productivity.

A device for plasma cutting of non-metallic materials is known, which consists of a plasmatron, affixed on a bearing strip, mounted on a tractor, which moves. The plasmatron consists of a central electrode-cathode, on which an insulator is mounted, while on the latter the base-frame is mounted, which has a nozzle at the front end. Three orifices are disposed in the base-frame, respectively, for feeding plasma forming gas, cooling water and current supply.

A disadvantage of this known device is that, it does not allow for direct interaction of the plasma arc, obtained in the plasmatron, its cutting, high-temperature plasma column and the non-metallic material being cut, as occurs when cutting metals.

SUMMARY OF THE INVENTION

It is a general object of this invention to develop a method and a device for plasma cutting of non-metallic materials, which uses as a cutting tool the column of the direct, high-temperature plasma arc.

This object is achieved by a method by placing under the material, which is to be cut, an additional non-melting electrode-anode, and by having the plasma arc burn between this electrode and the cathode. The spot of the concentrated plasma arc is forced out on the moving additional electrode-anode. This forces the arc to extend to a length greater than the thickness of the material being cut, and the thus formed arc is moved in space, coordinating the movement of the plasmatron and the additional electrode, and so forms a cut in the material.

The invention also includes a device for carrying out the method consisting of a plasmatron (plasma arc torch), to which a V-shaped rack is attached. An insulating transitional ring is mounted on the rack, to which there is affixed a metallic rim, V- or U-shaped, into which the cooling channels are machined. The insulating transitional ring is mounted on a disc which insures its ability to move along the rack. At the lower end of the metallic rim an additional non-melting electrode-anode is mounted. Perpendicular to the rack a bar is affixed, by which the rack is connected to an arrangement for spatially moving the entire device.

The additional non-melting electrode-anode could be implemented in two variants of the invention. In the first variant it consists of a hollow pipe, which is thickened. One end of the pipe is connected to a cylinder by means of a nut the outer surface of which is shaped as a driving wheel. A shaft is coaxially mounted in the bearing cylinder, the axis of which coincides with that of the hollow pipe and in which an input orifice is provided. The shaft is affixed to a frame, which is movable. Aside from that, on the frame itself there is mounted a graphite electrode, which is in contact with the outer surface of the cylinder.

In the second variation the additional non-melting electrode-anode consists also of a cylinder, on which outer surface a driving wheel is mounted, which is connected to a graphite electrode. In one end of the cylinder an interiorly threaded portion is disposed into which a water-cooled head is screwed and held tightly in the cylinder by a counter-nut. The cylinder is machined so as to have variable inner diameter. At the other end of the cylinder a bearing shaft is installed, which is made also with a variable outer diameter at one of its ends and has cross openings in the space between the different diameters. In the shaft there is a pipe concentrically installed. The shaft and the pipe are mounted in a short cylinder, which is affixed to the rim. Cross openings are machined in the short cylinder.

The advantages of the method and the device of the invention reside in that they allow to cut non-metallic materials with a heat source, which has a high degree of thermal energy concentration. The column of the plasma arc is moved out and forcibly elongated. Thus, high cutting speeds, different shapes of the cut elements and a high quality of the cut are achieved.

It is possible with the device of the invention to obtain arcs with different length and power, depending on the thickness of the material being cut. The process of cutting of non-metallic materials by this method becomes analogous to that of plasma cutting of metals.

The above objects, features and advantages of the invention along with other objects, features and advantages will become apparent upon a reading of the following description of preferred embodiments of the instant invention in connection with the drawings as follows:

BRIEF DESCRIPTION OF THE DRAWINGS

FIG. 1 is a schematic elevational view of the device of the invention;

DESCRIPTION OF THE PREFERRED EMBODIMENTS

Figure 2:
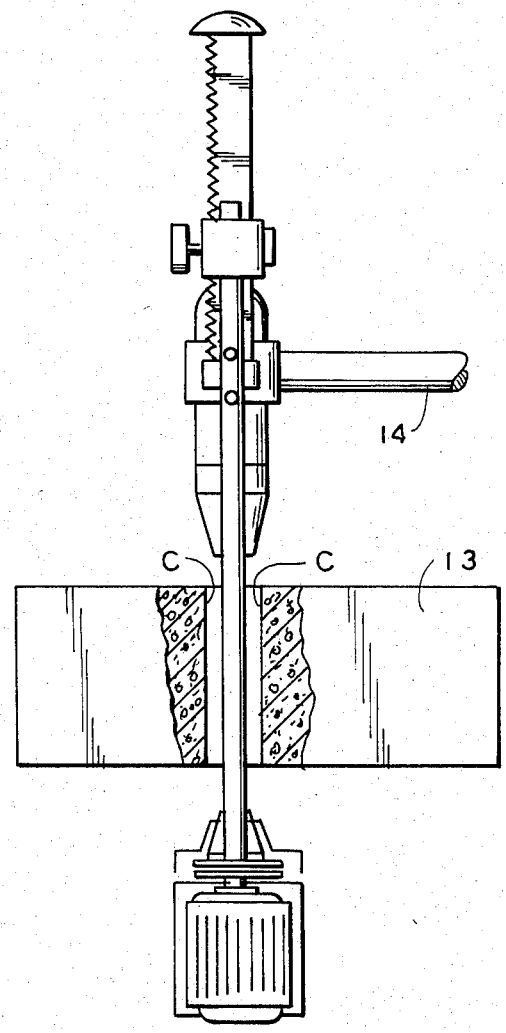
FIG. 2 is a side elevational view along arrow A in FIG. 1.

The device consists of a plasma arc torch for cutting 1, to which base 2, a V-shaped rack 4 is affixed. The plasma arc torch 1 is connected via supply cables 3 to an electric power source 7. The rack 4 is slidably movable in an insulating transitional bracket 6 and a wheel 5 having a shaft is threadably mounted in bracket 4 so as to insure the movement of the insulating transitional ring 6 along the rack 4. The insulating transitional bracket 6 is affixed on the metallic post 8, in which cooling channels are machined, and which can have a V- or U-shape. The shape and dimensions of the post are such that they insure alignment of the anode 11 which is affixed to a lower projecting arm 8A of the post 8. The material 13 to be cut is placed between the anode 11 and the plasma torch 1 and the post 8 passes through the cut C made in the material 13. The metallic post 8 is connected via a power supply cable 9 to the power supply source 7 and the cooling pipes 10 are attached to it. A bar 14 is perpendicularly affixed to the rack 4 and is connected to the transport mechanism for the whole device.

The auxiliary non-melting electrode-anode is illustrated by way of two embodiments.

Figure 3:
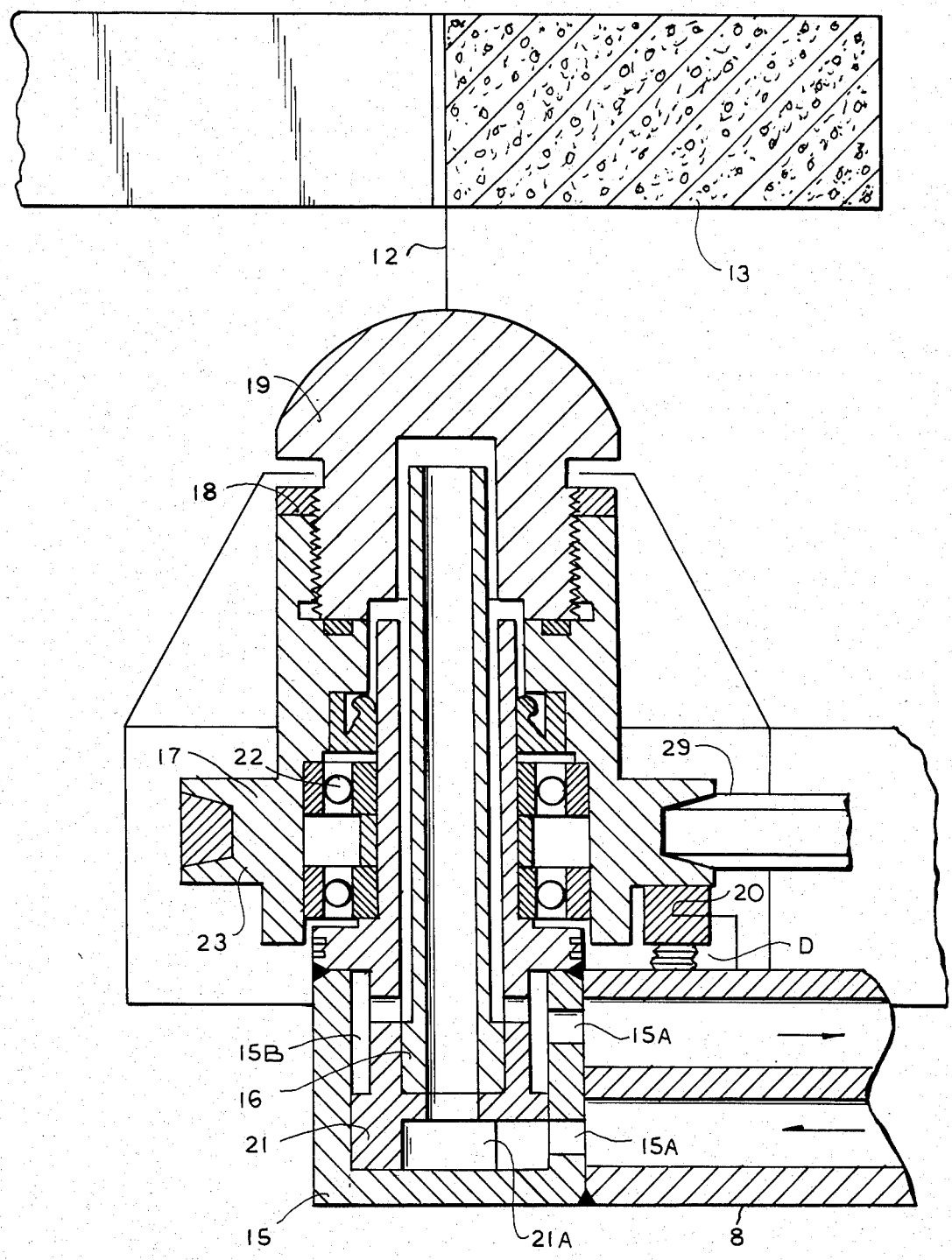
FIG. 3 is a longitudinal section of the additional non-melting electrode-anode, constituting a first embodiment of the invention.

In a first embodiment illustrated in FIG. 3, the electrode-anode 11 comprises a cylinder 17, into the outer surface of which a driving wheel 23 is machined. The wheel 23 is in sliding contact with a graphite electrode 20. A metallic cooling head 19 is screwed onto the front end of the cylinder 17. The head 19 is affixed to the cylinder 17 by the counter-nut 18. At the other end of the cylinder 17, a cylinder 21 extends into the cylinder 17 and is coaxially mounted therein via roller bearings 22. The cylinder 21 is machined with different outer diameters at one of its ends and has cross openings 15B in the space between the different diameters. A pipe 16 is mounted concentrically in the shaft 21. The cylinder 21 and pipe 16 are mounted in a short cylinder 15, which is affixed to the metallic post 8 and has cross openings 15A machined into it through which cooling fluid from the pipes 10 can circulate.

Figure 4:
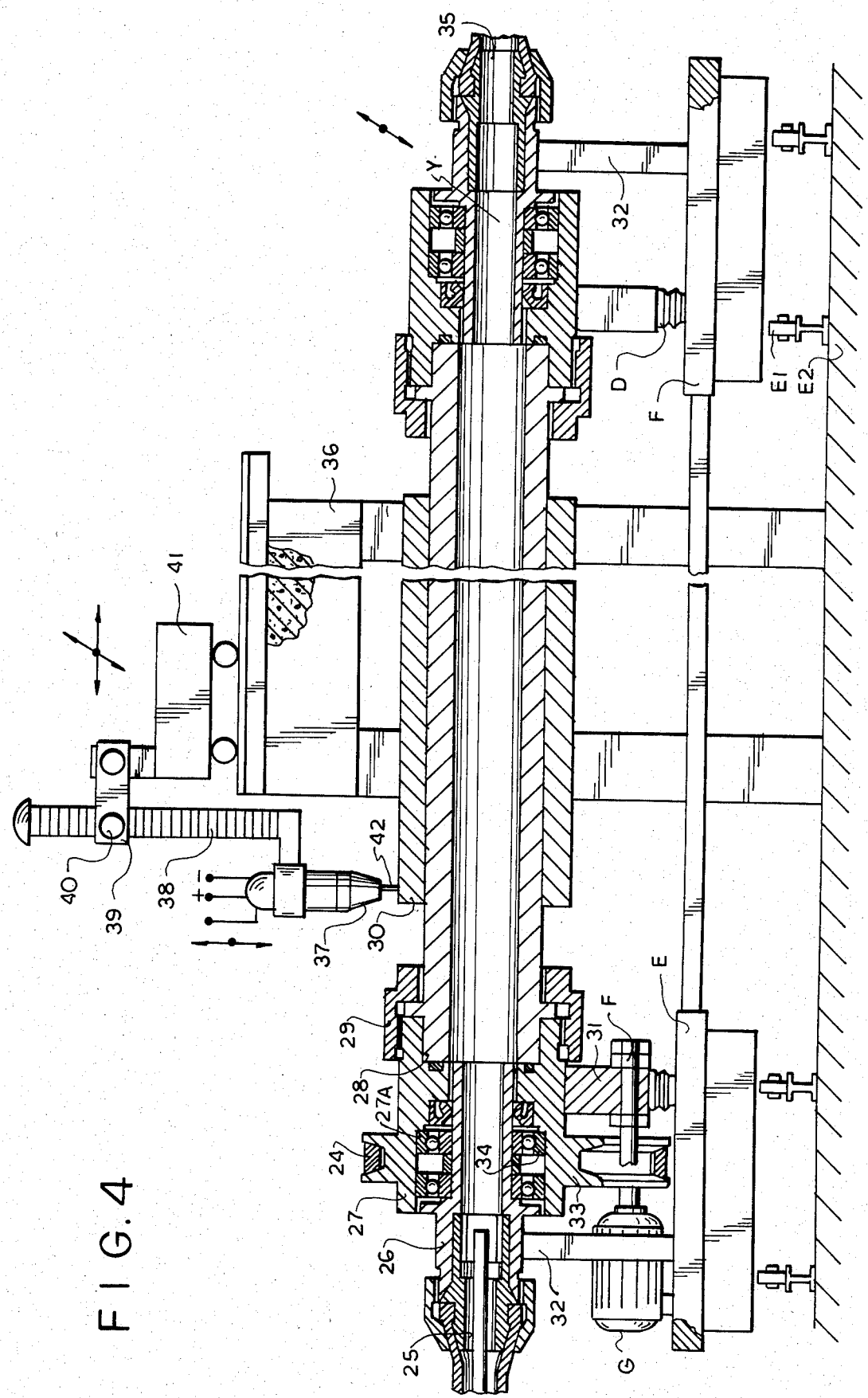
FIG. 4 is a longitudinal section of the additional non-melting electrode-anode, constituting a second embodiment of the invention and the arrangement incorporating the electrode-anode.

In a second embodiment of the electrode-anode is in the form of a pipe 28, on which a thicker cylinder 30 is mounted, which has a pair of interiorly threaded sleeves 29 mounted on opposite ends of cylinder 28. A cylinder 27 is threadably mounted in each sleeve 29. On the surface of one of these cylinders 27 a driving wheel 33 is machined. Hollow shafts 26 are rotatably mounted by way of roller bearings 34 relative to the cylinder 27 which roller bearings 34 are mounted in a recess 27A so that the cylinder 27 is in alignment with the pipe 28. The shafts 26 are fixedly supported on the posts 32, which are affixed to the movable bases E. On one of the bases E there is mounted an electric motor G which is drivingly connected to the driving wheel 33. A graphite electrode 31 is elastically supported on the base E and is in sliding contact with the cylinder 27. The electrode 31 is connected via cables F to a non-illustrated electric power source. In addition thereto the left hollow shaft is provided with an inlet opening 25 and the right hollow shaft 26 is provided with an outlet opening 35 for permitting a through-flow of a cooling medium. The electrode-anode is mounted under the material 36 to be cut. On the upper surface of the latter there is mounted the support carriage for the plasma arc torch 37. It is affixed to the rack 38, as illustrated in FIG. 4. The rack 38 is mounted in the insulating ring 39 having a wheel and shaft 40. The ring 39 is connected to a movable carriage 41.

The device for carrying out the method of the invention functions as follows:

In the first embodiment of the invention the plasma arc torch 1 for cutting is connected to the power supply source 7 through the power cables 3. Then the metallic frame 8 is connected to the power supply source 7 through the cable 9 in order to supply the necessary voltage to the auxiliary non-melting electrode-anode 11. Cooling water circulates via inlet and outlet 10 through the plasma arc torch 1 and the cooling channels of the metallic frame 8 and the openings 15A and gas for the plasma arc torch is also conducted thereto. With the aid of the bar 14 and the device is attached by way of the bracket 14 to a movable carriage (not illustrated in FIG. 2). Thereafter, the electrode-anode 11 is rotated by activating the motor 11A which is connected to the rotatable anode 11 by means of the belt 11B. The power source is switched on and the auxiliary arc of the plasma arc torch 1 is started and through the aid of the adjusting wheel 5 the auxiliary non-melting electrode-anode 11 is raised close to the nozzle 1A of the plasma arc torch 1. Then the main plasma arc 12 is struck and its base spot is aligned with the auxiliary non-melting electrode-anode 11. The plasma arc 12 is forcibly elongated to the necessary length by moving away the auxiliary non-melting electrode-anode 11 from the plasna arc torch 1 by using the adjusting wheel 5 and moving the rack 4 through the bracket 6. Thereafter the entire arrangement is placed astride the material 13 which will be cut, which is fed between the nozzle 1A of the plasma arc torch 1 and the auxiliary non-melting electrode-anode 11. When the plasma arc 12 gets in touch with the side wall of the non-metallic material 13, the power of the plasma arc torch 1 is increased and the device is put into motion and progresses at a speed commensurate with the cutting speed of the plasma arc torch 1.

There is illustrated in FIG. 1 a U-shaped frame B which is an alternate form for the post 8. In FIG. 2 the lines C indicate the boundaries of the cut through the material 13.

In the second embodiment the plasma arc torch 37 is connected to a power source. Circulation of the cooling water is started through the inlet orifice 25; the graphite electrode 31 is connected with the electric cable F and the place for cutting is defined on the material 36. The whole assembly forming the anode is mounted on a supporting frame E which can be moved on rails E2 via rollers E1 rotatably mounted on the frame E. The auxiliary electrode-anode 28 is brought into rotational motion via the motor 6, belt 24 and cylinder wheel 27; with the aid of the device for moving the base E on the rails E2, the anode 30 is placed in parallel with the line of the intended cut. After that the plasma arc torch 37, by means of the moving carriage device 41 is moved to the side of the material 36 to be cut. By means of an adjustment of the wheel 40 and the rack 38, the plasma torch 37 is lowered toward the electrode-anode 28. Plasma forming gas is fed into the torch 37 and the power supply source is switched on. After that the auxiliary arc is struck on the plasma arc torch 37, which as a result of the voltage redistribution moves towards the auxiliary electrode-anode 28. By means of the adjusting wheel 40 and the rack 38 the plasma arc 42 is then forcibly elongated to a length which is greater than the thickness of the material 36. The movable carriage 41 is switched on (which supports the plasma arc torch 37) and simultaneously the power of the plasma arc 42 is increased and it starts cutting the material 36.

During such cutting process only the plasma arc torch 37 moves, while the auxiliary electrode-anode 28 only rotates and is stationary in the horizontal plane.

It is within the scope of the invention to provide a method wherein the electrode-anode 28 has, in addition to the rotational motion, also a movement in the horizontal plane, concurrently with the motion of the plasma torch 37, while the position of the arc 42 in space must be such that it will be in continuous contact with the electrode-anode 28.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A method for cutting non-metallic material by means of a plasma are adapted to be formed between a plasma torch and a non-melting electrode-anode, comprising the steps of forcibly elongating the plasma arc by increasing the distance between said plasma torch and said non-melting electrode-anode to a predetermined extent so as to permit the passage of said non-metallic material therebetween to thereby place said non-metallic material under the direct action of said plasma arc; and thereafter cutting said non-metallic material by means of said plasma arc; rotating said non-melting electrode-anode prior and/or during cutting said non-metallic material to increase the life-span of said non-melting electrode-anode.

2. The method for cutting non-metallic material by means of a plasma arc as set forth in claim 1, wherein said plasma torch and electrode-anode move jointly relative to said non-metallic material while it is being cut by said plasma arc.

3. The method for cutting non-metallic material by means of a plasma arc as set forth in claim 1, wherein said plasma torch moves relative to said non-metallic material while the latter is being cut.

4. The method for cutting non-metallic material by means of a plasma arc as set forth in claim 1, wherein said plasma torch and electrode-anode move independently relative to said non-metallic material during the cutting thereof by said plasma arc.

* * * * *

UNITED STATES PATENT AND TRADEMARK OFFICE
CERTIFICATE OF CORRECTION

PATENT NO. : 4,691,090

DATED : September 1, 1987

INVENTOR(S) : Dimo T. GARLANOV ET AL

It is certified that error appears in the above-identified patent and that said Letters Patent are hereby corrected as shown below:   ITEM [75], The name of the second named inventor "Dimieter A. Dimitrov" should read --Dimiter A. Dimitrov--.

The name of the third named inventor "Marin H. Beleov: should read --Marin G. Beloev--.

The name of the fourth named inventor "Vladimir P. Hlbearov" should read --Vladimir P. Hlebarov--.

Signed and Sealed this

Sixteenth Day of February, 1988

*Attest:*

DONALD J. QUIGG

*Attesting Officer*   *Commissioner of Patents and Trademarks*